United States Patent
El-Refaey et al.

(10) Patent No.: US 9,313,665 B2
(45) Date of Patent: Apr. 12, 2016

(54) COORDINATION OF SPECTRUM USAGE RIGHTS AMONG ENTITIES

(71) Applicants: Mohamed El-Refaey, Cairo (EG);
Hazem Abdelmegeed, Maadi (EG);
Hani Elgebaly, Cairo (EG)

(72) Inventors: Mohamed El-Refaey, Cairo (EG);
Hazem Abdelmegeed, Maadi (EG);
Hani Elgebaly, Cairo (EG)

(73) Assignee: INTEL CORPORATION, Santa Clara, CA (US)

( * ) Notice: Subject to any disclaimer, the term of this patent is extended or adjusted under 35 U.S.C. 154(b) by 73 days.

(21) Appl. No.: 14/126,743

(22) PCT Filed: Jun. 26, 2013

(86) PCT No.: PCT/US2013/047959
§ 371 (c)(1),
(2) Date: Dec. 16, 2013

(87) PCT Pub. No.: WO2014/209306
PCT Pub. Date: Dec. 31, 2014

(65) Prior Publication Data
US 2015/0005022 A1    Jan. 1, 2015

(51) Int. Cl.
*H04W 16/14* (2009.01)
*H04W 12/06* (2009.01)

(52) U.S. Cl.
CPC .............. *H04W 16/14* (2013.01); *H04W 12/06* (2013.01)

(58) Field of Classification Search
CPC ..... H04W 12/00; H04W 12/06; H04W 12/08; H04W 16/00; H04W 16/14; H04W 16/16
USPC .............. 455/509, 501, 450, 451, 452.1, 464, 455/510, 188.1, 514, 67.11, 517; 370/329, 370/344, 210, 260; 705/7, 26
See application file for complete search history.

(56) References Cited

U.S. PATENT DOCUMENTS

| 8,798,548 B1 * | 8/2014 | Carbajal ............... 455/67.11 |
| 2009/0207800 A1 | 8/2009 | Shan et al. |

(Continued)

FOREIGN PATENT DOCUMENTS

| KR | 1020090098292 | 9/2009 |
| KR | 1020120094314 | 8/2012 |
| WO | 2012051157 | 4/2012 |

OTHER PUBLICATIONS

International Search Report and Written Opinion, mail date Mar. 31, 2014, PCT/ISA/210, PCT/ISA/220, PCT/ISA/237.

(Continued)

*Primary Examiner* — Tan H Trinh
(74) *Attorney, Agent, or Firm* — Pillsbury Winthrop Shaw Pittman LLP

(57) ABSTRACT

Systems, methods, and apparatuses are directed to coordination of spectrum usage rights among entities. In one embodiment, logic may be configured to receive, from a first entity, spectrum information relating to a first frequency range available for allocation, and store the spectrum information in a database. The logic may also be configured to receive a request for allocation of at least one frequency range to a second entity, and query the database for at least one frequency range available for allocation to the second entity based on the allocation request. The logic may further be configured to determine that the first frequency range is available to satisfy the allocation request based on the query and the storage of the spectrum information, and allocate the first frequency range to the second entity based on the determination that the first frequency range is available to satisfy the allocation request.

20 Claims, 5 Drawing Sheets

(56) References Cited

U.S. PATENT DOCUMENTS

| | | | |
|---|---|---|---|
| 2010/0105400 A1* | 4/2010 | Palmer | 455/450 |
| 2010/0142454 A1* | 6/2010 | Chang | 370/329 |
| 2010/0145745 A1* | 6/2010 | Stanforth et al. | 705/7 |
| 2011/0286401 A1 | 11/2011 | Wijting et al. | |
| 2011/0287802 A1* | 11/2011 | Ma et al. | 455/517 |
| 2013/0035124 A1* | 2/2013 | Schmidt et al. | 455/501 |
| 2013/0053080 A1* | 2/2013 | Gebert | 455/509 |
| 2013/0273953 A1* | 10/2013 | Srikanteswara et al. | 455/509 |
| 2013/0273958 A1* | 10/2013 | Srikanteswara et al. | 455/514 |

OTHER PUBLICATIONS

International Preliminary Report on Patentability mailed Jan. 7, 2016 for corresponding International Patent Application No. PCT/US2013/047959 (9 pages).

* cited by examiner

COORDINATION OF SPECTRUM USAGE RIGHTS AMONG ENTITIES

CROSS REFERENCE TO RELATED APPLICATIONS

This application is the U.S. National Stage of PCT/US2013/047959, filed Jun. 26, 2013, the contents of which are hereby incorporated by reference herein in its entirety.

TECHNICAL FIELD

This disclosure relates generally to spectrum usage management, and in particular, to coordination of spectrum usage rights among entities, such as spectrum owners, network operators, or other entities.

BACKGROUND ART

As a result of the recent influx of emerging wireless technologies and the growing number of users subscribing to wireless services, the wireless spectrums available to many service providers or other network operators have become increasingly congested. Congestion may, for example, lead to poor quality of service relating to low throughput, dropped packets, errors, latency, jitter, out-of-order delivery, or other issues.

DETAILED DESCRIPTION

Figure 1:
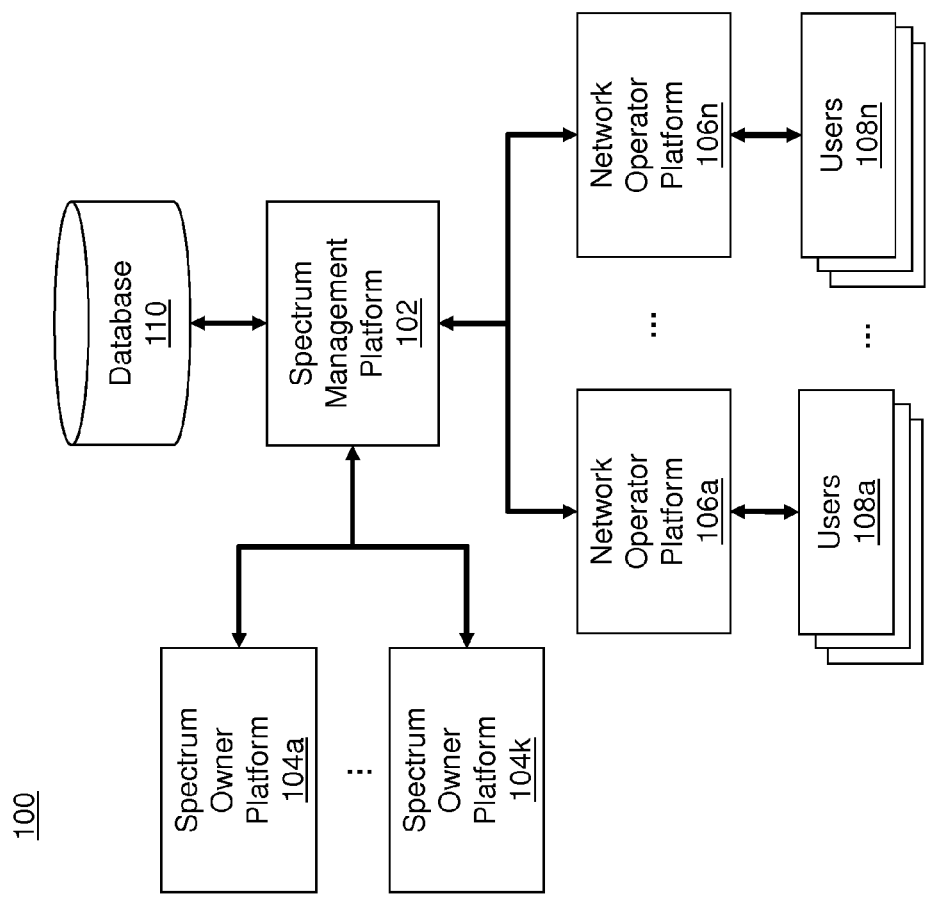
FIG. 1 depicts a high-level functional block diagram of a system for coordination of spectrum usage rights among entities, in accordance with various aspects of the present disclosure.

In the description that follows, like components may be given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, devices, systems, and/or methods for coordination of spectrum usage rights among entities. In one embodiment, a communication device for coordination of spectrum usage rights among entities may include a memory unit, and logic configured to: receive, from a first entity, spectrum information relating to a first frequency range available for allocation to an entity; store the spectrum information in a database, wherein the database includes information relating to frequency ranges available for allocation to an entity and information relating to frequency ranges allocated to an entity; receive a request for allocation of at least one frequency range to a second entity; query the database for at least one frequency range available for allocation to the second entity based on the allocation request; determine that the first frequency range is available to satisfy the allocation request based on the query and the storage of the spectrum information; and allocate the first frequency range to the second entity based on the determination that the first frequency range is available to satisfy the request.

In another embodiment, a system for coordination of spectrum usage rights among entities may include a communication device that includes a memory unit and logic configured to: receive, from a first entity, spectrum information relating to a first frequency range available for allocation to an entity; store the spectrum information in a database, wherein the database includes information relating to frequency ranges available for allocation to an entity and information relating to frequency ranges allocated to an entity; receive a request for allocation of at least one frequency range to a second entity; query the database for at least one frequency range available for allocation to the second entity based on the allocation request; determine that the first frequency range is available to satisfy the allocation request based on the query and the storage of the spectrum information; and allocate the first frequency range to the second entity based on the determination that the first frequency range is available to satisfy the request.

In another embodiment, a method for coordination of spectrum usage rights among entities may include: receiving, from a first entity, spectrum information relating to a first frequency range available for allocation to an entity; storing the spectrum information in a database, wherein the database includes information relating to frequency ranges available for allocation to an entity and information relating to frequency ranges allocated to an entity; receiving a request for allocation of at least one frequency range to a second entity; querying the database for at least one frequency range available for allocation to the second entity based on the allocation request; determining that the first frequency range is available to satisfy the allocation request based on the query and the storage of the spectrum information; and allocating the first frequency range to the second entity based on the determination that the first frequency range is available to satisfy the request.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a," "an," and "the" include plural referents unless the context clearly dictates otherwise.

FIG. 1 depicts a high-level functional block diagram of a system 100 for coordination of spectrum usage rights among entities, in accordance with various aspects of the present disclosure. As illustrated, system 100 includes a spectrum management platform 102 for coordinating spectrum usage rights among entities, such as spectrum owners, network operators, or other entities. Spectrum management platform 102 may be implemented on or included as part of a communication device. A communication device may, for instance, comprise any of a number of electronic and/or computing devices, both wireless and wired. As such, in some embodiments, communication devices may comprise one or more of servers, desktops, laptops, mobile devices, smart phones, and/or other devices.

Spectrum management platform 102 may communicate with one or more of spectrum owner platforms 104 (or platforms 104a-104k), network operator platforms 106 (or platforms 106a-106n), users 108 (or users 108a-108n), a database 110, or other components of system 100 via one or more communication networks to facilitate coordination of spectrum usage rights among entities. It should be noted that the communication mechanisms and networks as described herein are not intended to be limiting in any way, as the communications could be based on one or more standards and protocols including, but not limited to, Ethernet, Wi-Fi, Wi-Fi Direct, Bluetooth, NFC, radio frequency, GSM, CDMA, GPRS, 3G or 4G (e.g., WiMAX, LTE, etc.) cellular standards, Wireless USB, satellite communication, infrared, sonar, etc. As used herein, a communication network may comprise the Internet or any other suitable network, such as peer-to-peer, intranets, extranets, or other networks.

In one embodiment, with respect to FIG. 1, spectrum management platform 102 may receive spectrum information from a first entity. For example, the spectrum information may relate to a first frequency range available for allocation to an entity. The spectrum information received from the first entity may specify: (1) the first frequency range (e.g., 512 Mhz, 710-719 MHz, etc.); (2) bandwidth associated with the first frequency range; (3) an owner of the first frequency range; (4) a location where use of the first frequency range is available for allocation (e.g., latitude/longitude coordinates where the first frequency range is available, coverage radius defining the coverage area of the first frequency range, etc.); (5) maximum transmission power permitted over the first frequency range; (6) one or more types of entities that are permitted to be allocated the frequency range; (7) a whitelist of specific entities that are permitted to be allocated the frequency range; (8) a blacklist of specific entities that are not permitted to be allocated the frequency range; (9) a duration for an allocation of the frequency range (e.g., duration of a lease of usage rights associated with a frequency range allocation or other specified duration); (10) one or more costs in exchange for allocation of the frequency range (e.g., costs to a network operator to lease usage rights associated with a frequency range allocation or other costs); or (11) other information relating to the first frequency range.

The first entity may represent a spectrum owner that owns the first frequency range (e.g., an incumbent or other spectrum owner of the first frequency range). The first entity may be the spectrum owner, an agent of the spectrum owner, or other entity representing the spectrum owner. In one use case, one of the spectrum owner platforms 104 may transmit spectrum information to spectrum management platform 102 on behalf of the first entity. Spectrum management platform 102 may then store the spectrum information in database 110 (e.g., a spectrum database or other database). Database 110 may include information relating to frequency ranges available for allocation to an entity, information relating to frequency ranges unavailable for allocation to an entity, information relating to frequency ranges allocated to an entity for that entity's use, or other information.

In another embodiment, spectrum management platform 102 may receive a request for allocation of at least one frequency range to a second entity. The second entity may represent a network operator. The second entity may, for instance, be the network operator, an agent of the network operator, or other entity representing the network operator. In one scenario, one of the network operator platforms 106 may transmit the allocation request to spectrum management platform 102 on behalf of the second entity. Spectrum management platform 102 may query database 110 for at least one frequency available for allocation to the second entity based on the allocation request. Spectrum management platform 102 may determine one or more frequency ranges that are available to satisfy the allocation request based on the query. In one use case, the frequency ranges determined to be available to satisfy the allocation request may include the first frequency range. For example, based on the storage of the spectrum information relating to the first frequency range in database 110, the query may include a processing of the spectrum information that return results indicating that the first frequency range is available for allocation to the second entity to satisfy the allocation request.

In another embodiment, spectrum management platform 102 may allocate the first frequency range or other frequency range to the second entity based on the determination that the first frequency range or the other frequency range is available to satisfy the allocation request. By way of example, in response to the allocation of the first frequency range, the second entity may be allocated rights to use the first frequency range in accordance with a service level agreement (e.g., a service level agreement associated with the first frequency range, a service level agreement among one or more of an entity running spectrum management platform 102, the first entity, or the second entity, or other service level agreement).

In another embodiment, spectrum management platform 102 may update database 110 to indicate that the first frequency range is allocated to the second entity based on the allocation of the first frequency range. For example, in response to the allocation, the spectrum information stored in database 110 that relates to the first frequency range may be updated to indicate that the first frequency range is allocated to the second entity. Additionally, or alternatively, the spectrum information may be updated to indicate that the first frequency range is currently unavailable for allocation to an entity, updated to specify when the first frequency range will be become available for allocation to an entity, or updated to provide other information.

In another embodiment, spectrum management platform 102 may remove the allocation of the first frequency range from the second entity based on an occurrence of one or more conditions for deallocation of the first frequency. The conditions may include conditions relating to an expiration time associated with the allocation of the first frequency range, a deallocation request from an entity (e.g., a spectrum owner of the first frequency range, a network operator that is current allocated the first frequency range, an entity having allocation priority over the network operator currently allocated the first frequency range, or other entity), or other conditions.

In another embodiment, spectrum management platform 102 may update the database to indicate that the first frequency range is available for allocation to an entity based on the removal of the allocation of the first frequency range from the second entity. For example, in response to the allocation removal, the spectrum information stored in database 110 that relates to the first frequency range may be updated to indicate that the first frequency range is no longer allocated to the second entity, to indicate that the first frequency range is available for allocation to an entity, etc.

In another embodiment, spectrum management platform 102 may notify the second entity regarding an expiration time associated with the allocation of the first frequency range. By way of example, the notification may be provided to the second entity within a predetermined time period before the expiration time. In one scenario, a network operator that is currently allocated a frequency range may renew or extend the frequency range allocation such that the frequency range remains allocated to the network operator after an initial expiration time associated with the frequency range allocation. A notification that is provided to the network operator prior to the initial expiration time may include an alert regarding the expiration time along with information indicating steps to renew or extend the frequency range allocation (e.g., by clicking on a renew/extend link or other performing other actions). In this way, the second entity may take steps to renew or extend the frequency range allocation, initiate requests for one or more other frequency ranges, or make other accommodations prior to removal of the allocation of the first frequency range when the frequency range allocation expires.

In another embodiment, spectrum management platform 102 may receive a request for deallocation of the first frequency range, and remove the allocation of the first frequency range from the second entity based on the deallocation request. By way of example, the deallocation request may be received from the first entity. Spectrum management platform 102 may determine that the first entity represents a spectrum owner that owns the first frequency range. Spectrum management platform 102 may remove the allocation of the first frequency range from the second entity based on the deallocation request and the determination that the first entity represents the spectrum owner.

By way of example, a request for deallocation of the first frequency range (which may be allocated to the second entity at the time of the receipt of the deallocation request) may be granted if the deallocation request is initiated by an owner of the first frequency range, an entity having a higher priority status than the second entity, or other entity associated with a certain status. Thus, in response to the deallocation request from the first entity, spectrum management platform 102 may query database 110 for information relating to the first entity to determine whether the first entity is an owner of the first frequency range, has a higher priority status than the second entity, etc. In this case, based on the query, spectrum management platform 102 may determine that the first entity is an owner of the first frequency range. As such, spectrum management platform 102 may grant the deallocation request and initiate actions to remove the allocation of the first frequency range from the second entity.

In another embodiment, spectrum management platform 102 may reallocate the first frequency range to the first entity based on the deallocation request. By way of example, the deallocation request may include a request for allocation/reallocation of the first frequency range to the deallocation requestor (e.g., the first entity). As such, the first frequency range may be reclaimed from the second entity and allocated/reallocated to the deallocation requestor.

In another embodiment, spectrum management platform 102 may reallocate the first frequency range to a third entity different than the first entity and the second entity based on the deallocation request. For example, the deallocation request may include a request for allocation/reallocation of the first frequency range to another entity identified in the deallocation request other than the deallocation requestor. Thus, the first frequency range may be allocated/reallocated to the identified entity after the allocation of the first frequency range is removed from the second entity.

In another embodiment, spectrum management platform 102 may register the first entity and the second entity. Information relating to the registration of the first entity and second entity may be stored in database 110. By way of example, information relating to registration of an entity may include information relating to the entities that is obtained or determined during registration. Such information may include usernames or other account identifiers, passcodes or other passwords, regulatory identifications of the entities (e.g., federal agency registration numbers corresponding to the entities or other regulatory identifications), entity types associated with the entities, or other information. In one use case, for instance, if an entity is a spectrum owner, the information that may be obtained or determined during registration may include one or more indications of entities having permission to use frequency ranges owned by the spectrum owner. Other information obtained or determined during registration may include a device identifier of a device used to register an entity (e.g., media access control address (MAC), a serial number of the device, or other device identifier), a network address of the device used to register the entity (e.g., IP address, port number, etc.), a location of the device at the time of registration, etc.

In another embodiment, spectrum management platform 102 may authenticate the allocation request (for allocation of at least one frequency range to the second entity) based on the information relating to the registration of the second entity. In one use case, the allocation request may include an account identifier of the second entity, a password of the second entity, and a regulatory identification of the second entity. The account identifier, password, and regulatory identification of the second entity may be checked against the stored information of the second entity in database 110 to authenticate the allocation request by determining that the requesting entity is the second entity.

In another embodiment, spectrum management platform 102 may authenticate the allocation request (for allocation of at least one frequency range to the second entity) based on the information relating to the registration of the first entity. In one scenario, information obtained or determined during registration of the first entity may include one or more indications of entities having permission to use frequency ranges owned by the first entity. As discussed, the allocation request may include an account identifier of the second entity, a password of the second entity, and a regulatory identification of the second entity. After the determining that the requesting entity is the second entity based on the account identifier, the password, and the regulatory identification included in the allocation request, spectrum management platform 102 may check information stored in database 100 that relates to the first entity (e.g., obtained during registration of the first entity) to determine whether the second entity is an entity permitted to be allocated the first frequency range. Upon determining that the second entity is a permitted entity, the allocation request may be authenticated.

Figure 2:
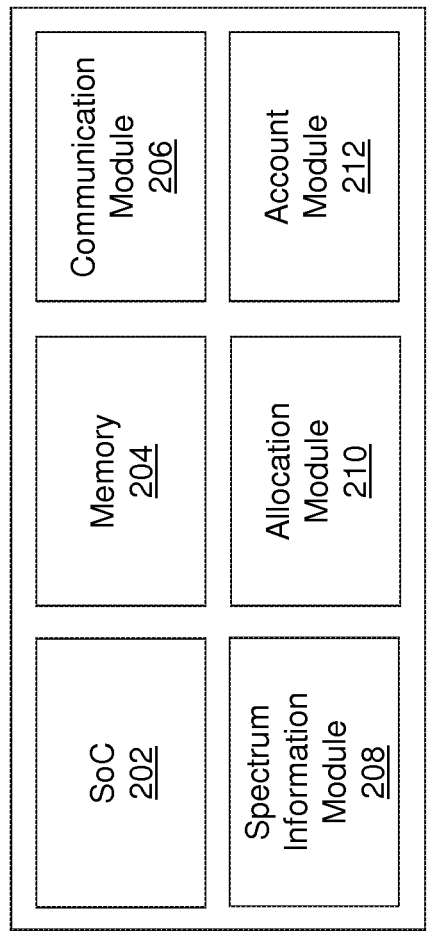
FIG. 2 illustrates a high-level functional block diagram of a spectrum management platform, in accordance with various aspects of the present disclosure.

FIG. 2 illustrates a high-level functional block diagram of spectrum management platform 102 for coordination of spectrum usage rights among entities, in accordance with various aspects of the present disclosure. As an example, spectrum management platform 102 may include a system-on-a-chip (SoC) 202, memory 204, a communication module 206, a spectrum information module 208, an allocation module 210, an account module 212, and/or other components. Spectrum management platform 102 may, for instance, also include a bus infrastructure and/or other interconnection means to connect and communicate information between various components of spectrum management platform 102. Spectrum management platform 102 may include a variety of peripheral components, such as, for example, a display screen, a speaker, a microphone, a camera, input devices, or other peripheral components.

In some embodiments, SoC 202 may be part of a core processing or computing unit of spectrum management platform 102, and may be configured to receive and process input data and instructions, and to provide output and/or control other components of spectrum management platform 102, in accordance with embodiments of the present disclosure. SoC 202 may include a microprocessor, a memory controller, a memory, and/or other components. The microprocessor may further include a cache memory (e.g., SRAM), which along with the memory of SoC 202 may be part of a memory hierarchy to store instructions and data. The microprocessor may also include one or more logic modules such as a field programmable gate array (FPGA) or other logic array. Communication between the SoC 202's microprocessor and memory may be facilitated by the memory controller (or chipset), which may also facilitate communication with peripheral components.

Memory 204 may be a dynamic storage device coupled to the bus infrastructure and configured to store information, instructions, and programs (e.g., such as applications integrated with software modules of spectrum management platform 102) to be executed by processors of SoC 202 and/or other processors (or controllers) associated with spectrum management platform 102. Some of all of memory 204 may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Spectrum management platform 102 may also include read only memory (ROM) and/or other static storage devices coupled to the bus infrastructure and configured to store static information and instructions for processors of SoC 202 and/or other processors (or controllers) associated with spectrum management platform 102.

Communication module 206 may be configured to facilitate communication among components of spectrum management platform 102, along with communication between components of spectrum management platform 102 and devices external to spectrum management platform 102 (e.g., spectrum owner platforms 104, network operator platforms 106, users devices associated with users 108, database 110, or other devices). Communication module 206 may, for instance, perform initial processing of received messages to determine where the messages are to be forwarded and/or how those messages should be further processed. In one use case, for instance, communication module 206 may be configured to receive spectrum information and forward the spectrum information to spectrum information module 208 based on an initial processing of the spectrum information.

Spectrum information module 208 may be configured to manage information relating to frequencies. Managed information may, for instance, include information relating to frequency ranges available for allocation to an entity, information relating to frequency ranges unavailable for allocation to an entity, information relating to frequency ranges allocated to an entity for that entity's use, or other information. In one embodiment, spectrum information module 208 may be configured to store spectrum information relating to one or more frequency ranges in response to receiving the spectrum information from a spectrum owner that owns the frequency ranges. In another embodiment, spectrum information module 208 may be configured to update database 110 in response to allocation of available frequency ranges to an entity, deallocation of frequency ranges allocated to an entity, modification of permissions associated with allocation of frequency ranges, or other changes.

Allocation module 210 may be configured to manage allocation, deallocation, or reallocation of frequency ranges. In one embodiment, allocation module 210 may query database 110 for at least one frequency range available for allocation to an entity in response to receiving a request for allocation of at least one frequency range to the entity. Based on the query, allocation module 210 may determine frequency ranges that are allocable, frequency ranges that are not currently allocated to another entity, frequency ranges to which the requesting entity is permitted to be allocated, etc. If, for instance, allocation module 210 determines that one or more frequency ranges are available to satisfy the allocation request, allocation module 210 may select one or more of the frequency ranges for allocation to the requesting entity to satisfy the allocation request. The selected frequency ranges may be then be allocated to the requesting entity.

In another embodiment, allocation module 210 may handle a request for deallocation of a frequency range that is currently allocated to an entity. For example, in response to receiving the deallocation request, allocation module 210 may determine whether deallocation of the currently-allocated frequency range is permitted where the deallocation request is from the particular deallocation requestor. In one use case, such deallocation may be permitted where the deallocation requestor is a spectrum owner of the currently-allocated frequency range. Allocation module 210 may, for instance, query database 110 for information relating to the deallocation requestor to determine whether the deallocation request is the spectrum owner. In response to determining that the deallocation requestor is the spectrum owner, allocation module 210 may initiate actions to remove the allocation of the frequency range from the entity to which the frequency range is currently allocated. Otherwise, allocation module 210 may deny the deallocation request.

In another embodiment, allocation module 210 may handle deallocation of a frequency range that is currently allocated to an entity based on an occurrence of one or more conditions for deallocation of the currently-allocated frequency range. For example, the conditions may include a condition relating to an expiration time associated with the allocation of the currently-allocated frequency range. Upon determining that the expiration time has passed or is approaching, allocation module may initiate actions to remove the allocation of the frequency range from the entity to which the frequency range is currently allocated.

Account module 212 may be configured to manage registration and other account-related aspects of spectrum management platform 102. In one scenario, account module 212 may manage registration of spectrum owners, network operators, or other entities with spectrum management platform 102. Information relating to the entities that is obtained or determined during registration may, for instance, be stored in database 110 for later use. Such information may include usernames or other account identifiers, passcodes or other passwords, regulatory identifications of the entities (e.g., federal agency registration numbers corresponding to the entities or other regulatory identifications), entity types associated with the entities, or other information. The stored information may, for instance, be used to authenticate requests for allocation or deallocation of frequency ranges, to determine frequency ranges that can satisfy frequency range allocations (e.g., certain frequency ranges may be reserved for particular entity types, spectrum owners may specify particular entity types or entities that are permitted to use frequency ranges that they own, etc.), or for other purposes.

In another scenario, account module 212 may manage modification of account information and/or deregistration of an entity. As an example, a spectrum owner may modify its account information to suspend allocation of frequency ranges of the spectrum owner to other entities. As another example, network operators or other entities may close/ deregister their spectrum exchange accounts, for instance, to avoid reoccurring registration or renewal fees associated with having a spectrum exchange account.

Figure 3:
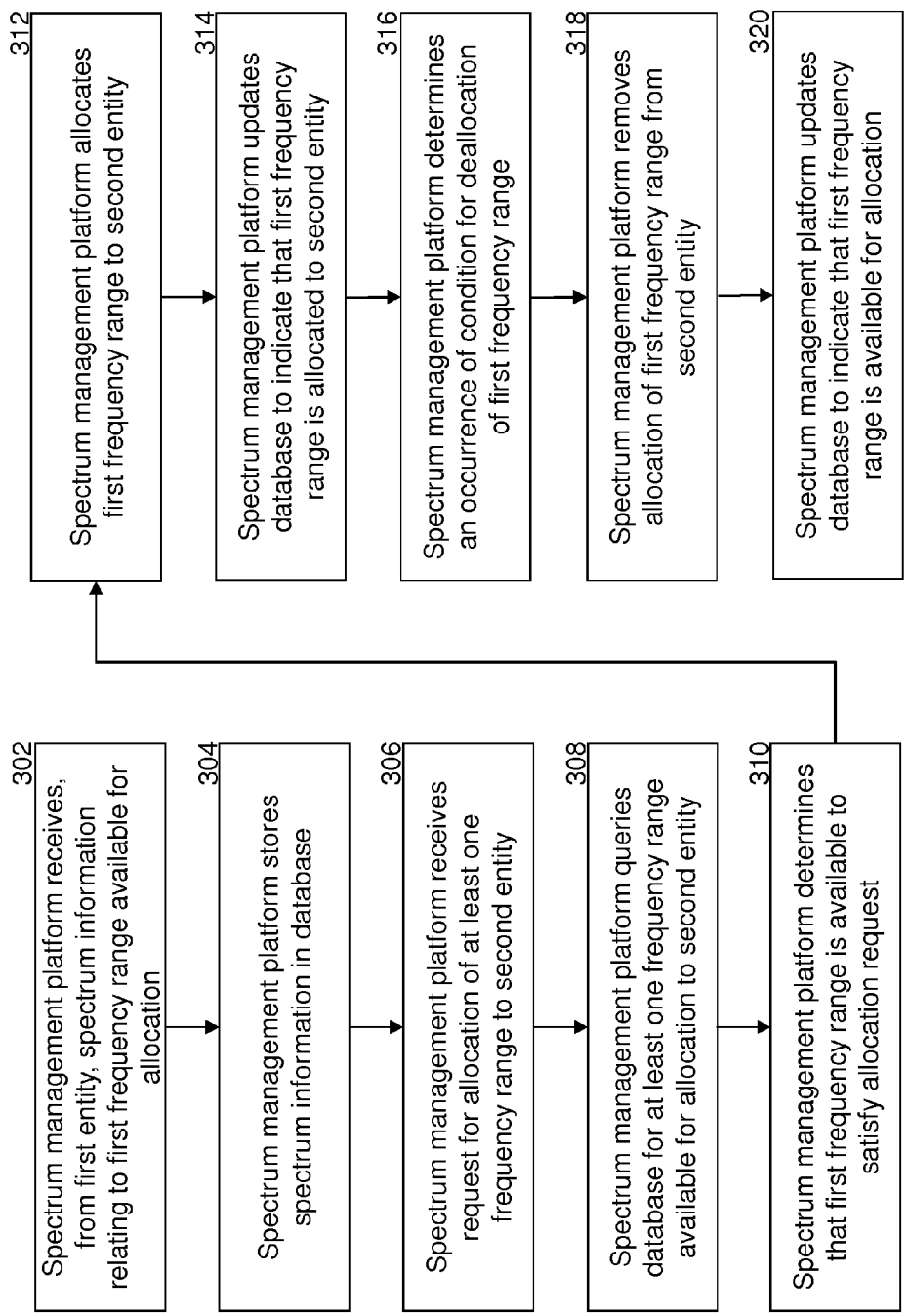
FIG. 3 depicts a high-level flow diagram of a process for coordination of spectrum usage rights among entities, in accordance with various aspects of the present disclosure.

FIG. 3 depicts a high-level flow diagram of a process for coordination of spectrum usage rights among entities, in accordance with various aspects of the present disclosure. It should be noted that the process of FIG. 3 is intended to be illustrative. In some embodiments, the process of FIG. 3 may be occur with one or more additional blocks not described, and/or without one or more of the blocks discussed. Additionally, the order with respect to the process that is illustrated in FIG. 3 and described below is not intended to be limiting. With such understanding in mind, in block 302, spectrum management platform 102 may receive, from a first entity, spectrum information relating to a first frequency range available for allocation to an entity. As an example, the first entity may represent a spectrum owner that owns the first frequency range (e.g., an incumbent or other spectrum owner of the first frequency range). The first entity may, for instance, be the spectrum owner, an agent of the spectrum owner, or other entity representing the spectrum owner.

In block 304, spectrum management platform 102 may store the spectrum information in database 110. As noted, database 110 may include information relating to frequency ranges available for allocation to an entity, information relating to frequency ranges unavailable for allocation to an entity, information relating to frequency ranges allocated to an entity for that entity's use, or other information.

In block 306, spectrum management platform 102 may receive a request for allocation of at least one frequency range to a second entity. The second entity may represent a network operator. The second entity may, for instance, be the network operator, an agent of the network operator, or other entity representing the network operator.

In block 308, spectrum management platform 102 may query database 110 for at least one frequency range available for allocation to the second entity based on the allocation request. In one use case, the second entity may be identified based on the allocation request. Database 110 may be queried for account information associated with second entity. The allocation request may be authenticated based on the account information associated with the second entity that is returned in response to the query for the account information. Database 110 may be queried for at least one frequency range available for allocation to the second entity based on the authentication of the allocation request (e.g., the allocation request is verified as initiated by the second entity or on behalf of the second entity, the second entity is determined to be a registered entity with spectrum management platform 102, etc.).

In block 310, spectrum management platform 102 may determine that the first frequency range is available to satisfy the allocation request. For example, based on the storage of the spectrum information relating to the first frequency range in database 110, the query may include a processing of the spectrum information that return results indicating that the first frequency range is available for allocation to the second entity to satisfy the allocation request. In one use case, the stored spectrum information may indicate that certain entity types, including an entity type of the second entity, is permitted to be allocated the first frequency range. The determination that the first frequency range is available to satisfy the allocation request may be based on the indication that the certain entity types include the entity type of the second entity. In another use case, the stored spectrum information may indicate that the second entity is an entity of a whitelist of entities that are permitted to be allocated the first frequency range. The determination that the first frequency range is available to satisfy the allocation request may be based on the indication that the whitelist includes the second entity.

In block 312, spectrum management platform 102 may allocate the first frequency range to the second entity based on the determination that the first frequency range is available to satisfy the allocation request. In one use case, in response to the allocation of the first frequency range, the second entity may be allocated rights to use the first frequency range. The allocated rights to use the first frequency range may, for instance, be in accordance with a service level agreement, such as a service level agreement associated with the first frequency range, a service level agreement among one or more of an entity running spectrum management platform 102, the first entity, or the second entity, or other service level agreement.

In block 314, spectrum management platform 102 may update database 110 to indicate that the first frequency range is allocated to the second entity. For example, the spectrum information stored in database 110 may be updated to indicate that the first frequency range is currently unavailable for allocation to an entity, that the first frequency range is currently allocated to the second entity, etc.

In block 316, spectrum management platform 102 may determine an occurrence of one or more conditions for deallocation of the first frequency range. By way of example, the conditions may include conditions relating to an expiration time associated with the allocation of the first frequency range, a deallocation request from an entity (e.g., a spectrum owner of the first frequency range, a network operator that is current allocated the first frequency range, an entity having allocation priority over the network operator currently allocated the first frequency range, or other entity), or other conditions.

In block 318, spectrum management platform 102 may remove the allocation of the first frequency range from the second entity based on an occurrence of the one or more deallocation conditions. In one use case, the second entity may have rights to use the first frequency range while the first frequency range is allocated to the second entity (e.g., to provide users with services that utilize the first frequency range and/or other frequency ranges, or to utilize the first frequency range and/or the other frequency ranges for other purposes). In response to the removal of the allocation of the first frequency range, the second entity may no longer have rights to use the first frequency range.

In block 320, spectrum management platform 102 may update database 110 to indicate that the first frequency range is available for allocation to an entity. For example, in response to the allocation removal, the spectrum information stored in database 110 that relates to the first frequency range may be updated to indicate that the first frequency range is no longer allocated to the second entity, to indicate that the first frequency range is available for allocation to an entity, etc.

Figure 4:
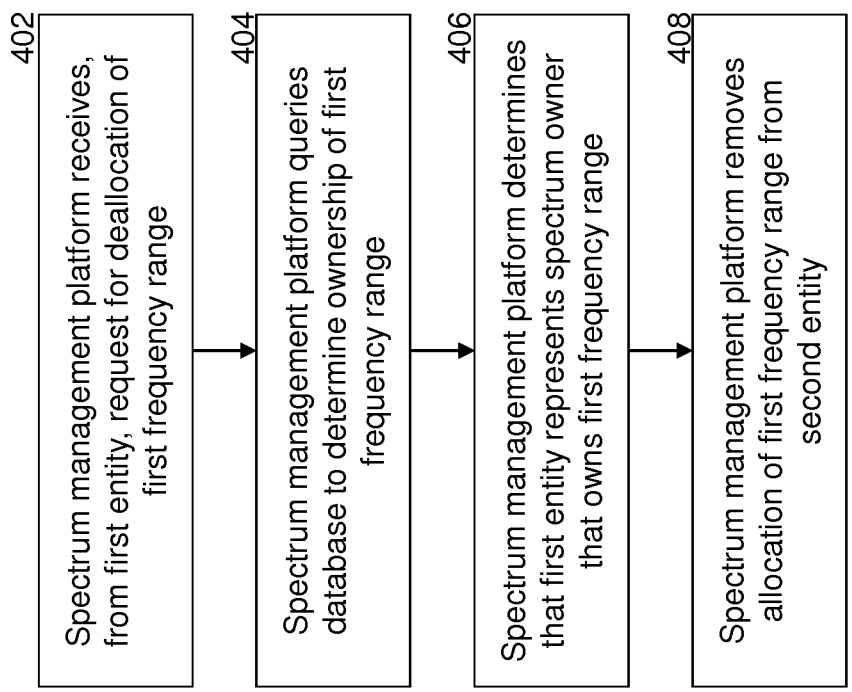
FIG. 4 depicts a high-level flow diagram of a process for managing requests for deallocation of one or more frequency ranges, in accordance with various aspects of the present disclosure.

FIG. 4 depicts a high-level flow diagram of a process for managing requests for deallocation of one or more frequency ranges, in accordance with various aspects of the present disclosure. It should be noted that the process of FIG. 4 is intended to be illustrative. In some embodiments, the process of FIG. 4 may be occur with one or more additional blocks not described, and/or without one or more of the blocks discussed. Additionally, the order with respect to the process that is illustrated in FIG. 4 and described below is not intended to be limiting. With such understanding in mind, in block 402, spectrum management platform 102 may receive, from a first entity, a request for deallocation of a first frequency range. For example, the first frequency range may currently be allocated to a second entity. In one use case, the first entity may represent a spectrum owner that owns the first frequency range. The first entity may be the spectrum owner, an agent of the spectrum owner, or other entity representing the spectrum owner. The second entity may represent a network operator that provides services utilizing the first frequency range and/or other frequency ranges to users. The second entity may be the network operator, an agent of the network operator, or other entity representing the network operator. It should be noted that, in some embodiments, the first entity may also be a network operator and/or the second entity may also be a spectrum owner.

In block 404, spectrum management platform 102 may query database 110 to determine ownership of the first frequency range. For example, a request for deallocation of a frequency range that is currently allocated to a particular network operator may be granted if the deallocation request is initiated by an owner of the currently-allocated frequency range, an entity having a higher priority status than the particular network operator, or other entity associated with a certain status. Thus, in response to a request for deallocation of a currently-allocated frequency range, spectrum management platform 102 may query database 110 for information relating to the deallocation requestor to determine whether the deallocation requestor is an owner of the currently-allocated frequency range, has a higher priority status than the entity that is currently allocated the frequency range, etc.

In block 406, spectrum management platform 102 may determine that the first entity represents a spectrum owner that owns the first frequency range. For example, the query of database 110 to determine a status associated with the first entity (e.g., the deallocation requestor) may return results indicating that the first entity is the owner of the first frequency range.

In block 408, spectrum management platform 102 may remove the allocation of the first frequency range from a second entity to which the first frequency range is currently allocated. In one use case, the second entity may have rights to use the first frequency range while the first frequency range is allocated to the second entity (e.g., to provide users with services that utilize the first frequency range and/or other frequency ranges, or to utilize the first frequency range and/or the other frequency requests for other purposes). In response to the removal of the allocation of the first frequency range, the second entity may no longer have rights to use the first frequency range.

In some embodiments, a request for deallocation of a frequency range that is currently allocated to an entity may include one or more other requests. For example, a request for deallocation of the first frequency range that is currently allocated to a second entity may include a request for allocation/reallocation of the first frequency range to the deallocation requestor or other entity. As such, after the allocation of the first frequency range is removed from an entity in response to the deallocation request, the first frequency range may be allocated/reallocated to the deallocation requestor or other entity identified in the allocated/reallocation request.

Figure 5:
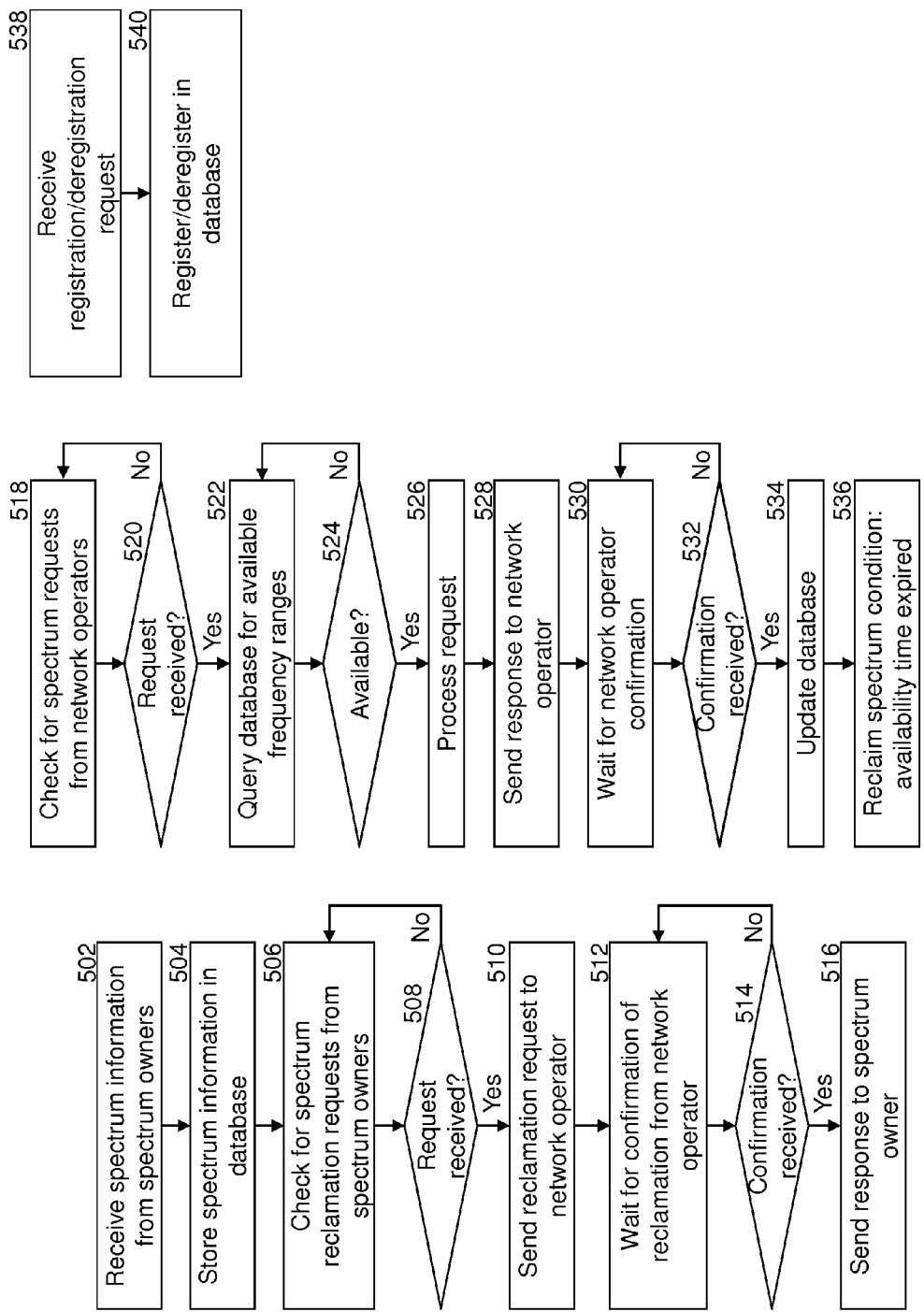
FIG. 5 depicts a high-level flow diagram of processes for coordination of spectrum usage rights among entities, in accordance with various aspects of the present disclosure.

FIG. 5 depicts a high-level flow diagram of processes for coordination of spectrum usage rights among entities, in accordance with various aspects of the present disclosure. It should be noted that the processes of FIG. 5 are intended to be illustrative. In some embodiments, the processes of FIG. 5 may be occur with one or more additional blocks not described, and/or without one or more of the blocks discussed. Additionally, the order with respect to the processes that are illustrated in FIG. 5 and described below are not intended to be limiting. With such understanding in mind, in block 502, spectrum management platform 102 may receive spectrum information from spectrum owners. The spectrum information may relate to frequency ranges available for allocation to one or more entities.

The spectrum information received from the spectrum owners may, for instance, specify: (1) the frequency ranges (e.g., a start frequency of a frequency range, an end frequency of the frequency range, etc.); (2) bandwidth associated with the frequency ranges; (3) owners of the frequency ranges; (4) locations where use of the frequency ranges is available for allocation (e.g., latitude/longitude coordinates where the frequency ranges are available, coverage radiuses defining the coverage areas of the frequency range, etc.); (5) maximum transmission power permitted over the frequency ranges; (6) one or more types of entities that are permitted to be allocated the frequency ranges; (7) whitelists of specific entities that are permitted to be allocated the frequency ranges; (8) blacklists of specific entities that are not permitted to be allocated the frequency ranges; (9) a duration for an allocation of the frequency range (e.g., duration of a lease of usage rights associated with a frequency range allocation or other specified duration); (10) one or more costs in exchange for allocation of the frequency range (e.g., costs to a network operator to lease usage rights associated with a frequency range allocation or other costs); or (11) other information relating to the first frequency range.

In block 504, spectrum management platform 102 may store the spectrum information in database 110. As discussed, among other information, database 110 may include information relating to frequency ranges available for allocation to an entity, information relating to frequency ranges unavailable for allocation to an entity, or information relating to frequency ranges allocated to an entity for that entity's use.

In block 506, spectrum management platform 102 may check for spectrum reclamation requests from spectrum owners (e.g., deallocation requests). If, in block 508, it is determined that a reclaim request from a spectrum owner has been received, spectrum management platform 102 may in block 510 send the reclaim request to a network operator that is currently allocated one or more frequency ranges that are specified for reclamation in the reclamation request and that are owned by the spectrum owner.

In block 512, spectrum management platform 102 may wait for confirmation of reclamation from the network operator to which the frequency ranges specified in the reclamation request is currently allocated. The confirmation from the network operator may, for instance, indicate that the network operator has vacated the leased frequency ranges. In this way, spectrum management platform 102 may ensure that the network operator has vacated the leased frequency ranges before allowing the spectrum owner to use the frequency ranges.

If, in block 514, it is determined that the confirmation has been received from the network operator, spectrum management platform 102 may in block 516 send a response to the spectrum operator to indicate that the frequency ranges have been reclaimed.

In block 518, spectrum management platform 102 may check for spectrum requests from network operators. Spectrum requests may, for instance, include a request for one or more frequency ranges that are available for allocation. If, in block 520, it is determined that a spectrum request has been received, spectrum management platform 102 may in block 522 query database 110 for frequency ranges that are available for allocation.

If, in block 524, it is determined that one or more frequency ranges are available for allocation, spectrum management platform 102 may in block 526 process the spectrum request. Processing of the spectrum request may include checking the consistency of the requesting network operator's base stations' locations and the locations in which use of the available frequency ranges is permitted, checking that the available frequency ranges include the requested frequency ranges, and/or allocating the requested frequency ranges (if available) to the requesting network operator.

In block 528, spectrum management platform 102 may send a response to the requesting network operator. The response may include information relating to the frequency ranges that will be allocated to the requesting network operator. Such information may, for instance, specify: (1) the frequency ranges; (2) globally unique identifiers associated with the frequency ranges with respect to the domain of the spectrum management platform 102 (or other coordinating unit); (3) bandwidth of the frequency ranges; (4) a start time at which the frequency ranges will be available for use; (5) an expiration time at which the frequency ranges will become unavailable for use; (6) locations where use of the frequency ranges by the network operator is permitted (e.g., latitude/longitude coordinates where the frequency ranges are available for use by the network operator, coverage radiuses defining the coverage areas of the frequency range, etc.); (7) maximum transmission power permitted over the frequency ranges; or (8) other information.

In block 530, spectrum management platform 102 may wait for confirmation from the requesting network operator. The confirmation from the network operator may include a confirmation indicating that the network operator has accepted the allocation of the frequency ranges indicated in the response sent by spectrum management platform 102.

If, in block 532, it is determined that the confirmation is received from the requesting network operator, spectrum management platform 102 may in block 534 update database 110 to indicate that the frequency ranges have been allocated, that the frequency ranges are not currently available for allocation to another entity, etc.

In block 536, one or more conditions for reclamation of the allocated frequency ranges may occur. Reclamation conditions may include conditions relating to an expiration time associated with the allocation of the frequency ranges, a request from a spectrum owner of the allocated frequency ranges to reclaim the allocated frequency ranges, or other conditions. By way of example, if spectrum management platform 102 determines that an expiration time associated with the frequency range allocations have been reached, spectrum management platform 102 may initiate actions to remove the frequency range allocations from the network operator to which the frequency ranges are currently allocated and reallocate the frequency ranges to the spectrum owner.

In block 538, spectrum management platform 102 may receive registration or deregistration requests from one or more entities. Based on the registration or deregistration requests, spectrum management platform may in block 540 register or deregister the entities in database 110. As an example, information obtain or determined during registration (or removed from database 110 during deregistration) may include usernames or other account identifiers, passcodes or other passwords, regulatory identifications of the entities (e.g., federal agency registration numbers corresponding to the entities or other regulatory identifications), entity types associated with the entities, or other information. Other information obtained or determined during registration may include a device identifier of a device used to register an entity (e.g., media access control address (MAC), a serial number of the device, or other device identifier), a network address of the device used to register the entity (e.g., IP address, port number, etc.), a location of the device at the time of registration, etc.

By virtue of the disclosed configurations and processes, with respect to spectrum management, a number of benefits are achieved. Some of these benefits may, for instance, include reduced congestion of wireless spectrums, improved quality of service to wireless users, increased utilization of unused spectrum resources (e.g., owned by public safety agencies or other spectrum owners), real-time coordination of spectrum usage rights exchange, and/or other benefits.

EXAMPLES

The following examples pertain to further embodiments.

Example 1 is a communication device comprising a memory unit, and logic configured to: receive, from a first entity, spectrum information relating to a first frequency range available for allocation to an entity; store the spectrum information in a database, wherein the database includes information relating to frequency ranges available for allocation to an entity and information relating to frequency ranges allocated to an entity; receive a request for allocation of at least one frequency range to a second entity; query the database for at least one frequency range available for allocation to the second entity based on the allocation request; determine that the first frequency range is available to satisfy the allocation request based on the query and the storage of the spectrum information; and allocate the first frequency range to the second entity based on the determination that the first frequency range is available to satisfy the request.

In Example 2, the subject matter of Example 1 may optionally include that the first entity represents a spectrum owner that owns the first frequency range.

In Example 3, the subject matter of any one of Examples 1 and 2 may optionally include that the second entity represents a network operator.

In Example 4, the subject matter of any one of Examples 1-3 may optionally include that the logic is configured to update the database to indicate that the first frequency range is allocated to the second entity based on the allocation of the first frequency range.

In Example 5, the subject matter of any one of Examples 1-4 may optionally include that the logic is configured to: remove the allocation of the first frequency range from the second entity based on an occurrence of one or more conditions for deallocation of the first frequency range; and update the database to indicate that the first frequency range is available for allocation to an entity based on the removal.

In Example 6, the subject matter of Example 5 may optionally include that the one or more conditions relate to an expiration time associated with the allocation of the first frequency range, and that the removal is based on a determination that the expiration time has been reached.

In Example 7, the subject matter of Example 6 may optionally include that the logic is configured to notify the second entity regarding the expiration time within a predetermined time period before the expiration time.

In Example 8, the subject matter of any one of Examples 1-7 may optionally include that the logic is configured to: receive, from the first entity, a request for deallocation of the first frequency range; and remove the allocation of the first frequency range from the second entity based on the deallocation request.

In Example 9, the subject matter of Example 8 may optionally include that the removal is based on a determination that the first entity represents a spectrum owner that owns the first frequency range.

In Example 10, the subject matter of any one of Examples 8 and 9 may optionally include that the logic is configured to reallocate the first frequency range to the first entity based on the deallocation request.

In Example 11, the subject matter of any one of Examples 1-10 may optionally include that the logic is configured to: register the first entity and the second entity; store information relating to the registration of the first entity and the second entity in the database; and authenticate the allocation request based on the information relating to the registration of the second entity, wherein the allocation of the first frequency range is based on the authentication.

In Example 12, the subject matter of Example 11 may optionally include that the authentication is further based on the information relating to the registration of the first entity.

In Example 13, the subject matter of any one of Examples 11 and 12 may optionally include that the information relating to the registration of the first entity includes an indication of entities having permission to use the first frequency range.

Example 14 is a system comprising a communication device that includes a memory unit and logic configured to: receive, from a first entity, spectrum information relating to a first frequency range available for allocation to an entity; store the spectrum information in a database, wherein the database includes information relating to frequency ranges available for allocation to an entity and information relating to frequency ranges allocated to an entity; receive a request for allocation of at least one frequency range to a second entity; query the database for at least one frequency range available for allocation to the second entity based on the allocation request; determine that the first frequency range is available to satisfy the allocation request based on the query and the storage of the spectrum information; and allocate the first frequency range to the second entity based on the determination that the first frequency range is available to satisfy the request.

In Example 15, the subject matter of Example 14 may optionally include that the first entity represents a spectrum owner that owns the first frequency range.

In Example 16, the subject matter of any one of Examples 14 and 15 may optionally include that the second entity represents a network operator.

In Example 17, the subject matter of any one of Examples 14-16 may optionally include that the logic is configured to update the database to indicate that the first frequency range is allocated to the second entity based on the allocation of the first frequency range.

In Example 18, the subject matter of any one of Examples 14-17 may optionally include that the logic is configured to: remove the allocation of the first frequency range from the second entity based on an occurrence of one or more conditions for deallocation of the first frequency range; and update the database to indicate that the first frequency range is available for allocation to an entity based on the removal.

In Example 19, the subject matter of Example 18 may optionally include that the one or more conditions relate to an expiration time associated with the allocation of the first frequency range, and that the removal is based on a determination that the expiration time has been reached.

In Example 20, the subject matter of Example 19 may optionally include that the logic is configured to notify the second entity regarding the expiration time within a predetermined time period before the expiration time.

In Example 21, the subject matter of any one of Examples 14-20 may optionally include that the logic is configured to: receive, from the first entity, a request for deallocation of the first frequency range; and remove the allocation of the first frequency range from the second entity based on the deallocation request.

In Example 22, the subject matter of Example 21 may optionally include that the removal is based on a determination that the first entity represents a spectrum owner that owns the first frequency range.

In Example 23, the subject matter of any one of Examples 21 and 22 may optionally include that the logic is configured to reallocate the first frequency range to the first entity based on the deallocation request.

In Example 24, the subject matter of any one of Examples 14-23 may optionally include that the logic is configured to: register the first entity and the second entity; store information relating to the registration of the first entity and the second entity in the database; and authenticate the allocation request based on the information relating to the registration of the second entity, wherein the allocation of the first frequency range is based on the authentication.

In Example 25, the subject matter of Example 24 may optionally include that the authentication is further based on the information relating to the registration of the first entity.

In Example 26, the subject matter of any one of Examples 24 and 25 may optionally include that the information relating to the registration of the first entity includes an indication of entities having permission to use the first frequency range.

Example 27 is a method comprising: receiving, from a first entity, spectrum information relating to a first frequency range available for allocation to an entity; storing the spectrum information in a database, wherein the database includes information relating to frequency ranges available for allocation to an entity and information relating to frequency ranges allocated to an entity; receiving a request for allocation of at least one frequency range to a second entity; querying the database for at least one frequency range available for allocation to the second entity based on the allocation request; determining that the first frequency range is available to satisfy the allocation request based on the query and the storage of the spectrum information; and allocating the first frequency range to the second entity based on the determination that the first frequency range is available to satisfy the request.

In Example 28, the subject matter of Example 27 may optionally include that the first entity represents a spectrum owner that owns the first frequency range.

In Example 29, the subject matter of any one of Examples 27 and 28 may optionally include that the second entity represents a network operator.

In Example 30, the subject matter of any one of Examples 27-29 may optionally include that the method includes updating the database to indicate that the first frequency range is allocated to the second entity based on the allocation of the first frequency range.

In Example 31, the subject matter of any one of Examples 27-30 may optionally include that the method includes: removing the allocation of the first frequency range from the second entity based on an occurrence of one or more conditions for deallocation of the first frequency range; and updating the database to indicate that the first frequency range is available for allocation to an entity based on the removal.

In Example 32, the subject matter of Example 31 may optionally include that the one or more conditions relate to an expiration time associated with the allocation of the first frequency range, and that the removal is based on a determination that the expiration time has been reached.

In Example 33, the subject matter of Example 32 may optionally include that the method includes notifying the second entity regarding the expiration time within a predetermined time period before the expiration time.

In Example 34, the subject matter of any one of Examples 27-33 may optionally include that the method includes: receiving, from the first entity, a request for deallocation of the first frequency range; and removing the allocation of the first frequency range from the second entity based on the deallocation request.

In Example 35, the subject matter of Example 34 may optionally include that the removal is based on a determination that the first entity represents a spectrum owner that owns the first frequency range.

In Example 36, the subject matter of any one of Examples 34 and 35 may optionally include that the method includes reallocating the first frequency range to the first entity based on the deallocation request.

In Example 37, the subject matter of any one of Examples 27-36 may optionally include that the method includes: registering the first entity and the second entity; storing information relating to the registration of the first entity and the second entity in the database; and authenticating the allocation request based on the information relating to the registration of the second entity, wherein the allocation of the first frequency range is based on the authentication.

In Example 38, the subject matter of Example 37 may optionally include that the authentication is further based on the information relating to the registration of the first entity.

In Example 39, the subject matter of any one of Examples 37 and 38 may optionally include that the information relating to the registration of the first entity includes an indication of entities having permission to use the first frequency range.

Example 40 is a computer-readable medium comprising computer-readable instructions physically embodied thereon which, when executed by a processor, causes the processor to perform a method. Such method includes: receiving, from a first entity, spectrum information relating to a first frequency range available for allocation to an entity; storing the spectrum information in a database, wherein the database includes information relating to frequency ranges available for allocation to an entity and information relating to frequency ranges allocated to an entity; receiving a request for allocation of at least one frequency range to a second entity; querying the database for at least one frequency range available for allocation to the second entity based on the allocation request; determining that the first frequency range is available to satisfy the allocation request based on the query and the storage of the spectrum information; and allocating the first frequency range to the second entity based on the determination that the first frequency range is available to satisfy the request.

In Example 41, the subject matter of Example 40 may optionally include that the first entity represents a spectrum owner that owns the first frequency range.

In Example 42, the subject matter of any one of Examples 40 and 41 may optionally include that the second entity represents a network operator.

In Example 43, the subject matter of any one of Examples 40-42 may optionally include that the method includes updating the database to indicate that the first frequency range is allocated to the second entity based on the allocation of the first frequency range.

In Example 44, the subject matter of any one of Examples 40-43 may optionally include that the method includes: removing the allocation of the first frequency range from the second entity based on an occurrence of one or more conditions for deallocation of the first frequency range; and updating the database to indicate that the first frequency range is available for allocation to an entity based on the removal.

In Example 45, the subject matter of Example 44 may optionally include that the one or more conditions relate to an expiration time associated with the allocation of the first frequency range, and that the removal is based on a determination that the expiration time has been reached.

In Example 46, the subject matter of Example 45 may optionally include that the method includes notifying the second entity regarding the expiration time within a predetermined time period before the expiration time.

In Example 47, the subject matter of any one of Examples 40-46 may optionally include that the method includes: receiving, from the first entity, a request for deallocation of the first frequency range; and removing the allocation of the first frequency range from the second entity based on the deallocation request.

In Example 48, the subject matter of Example 47 may optionally include that the removal is based on a determination that the first entity represents a spectrum owner that owns the first frequency range.

In Example 49, the subject matter of any one of Examples 47 and 48 may optionally include that the method includes reallocating the first frequency range to the first entity based on the deallocation request.

In Example 50, the subject matter of any one of Examples 40-49 may optionally include that the method includes: registering the first entity and the second entity; storing information relating to the registration of the first entity and the second entity in the database; and authenticating the allocation request based on the information relating to the registration of the second entity, wherein the allocation of the first frequency range is based on the authentication.

In Example 51, the subject matter of Example 50 may optionally include that the authentication is further based on the information relating to the registration of the first entity.

In Example 52, the subject matter of any one of Examples 50 and 51 may optionally include that the information relating to the registration of the first entity includes an indication of entities having permission to use the first frequency range.

Example 53 is a communication device comprising a memory unit, and logic configured to: receive, from a first entity, spectrum information relating to a first frequency range available for allocation to an entity; store the spectrum information in a database, wherein the database includes information relating to frequency ranges available for allocation to an entity and information relating to frequency ranges allocated to an entity; receive a request for allocation of at least one frequency range to a second entity; query the database for at least one frequency range available for allocation to the second entity based on the allocation request; determine that the first frequency range is available to satisfy the allocation request based on the query and the storage of the spectrum information; and allocate the first frequency range to the second entity based on the determination that the first frequency range is available to satisfy the request.

In Example 54, the subject matter of Example 53 may optionally include that the first entity represents a spectrum owner that owns the first frequency range.

In Example 55, the subject matter of any one of Examples 53 and 54 may optionally include that the second entity represents a network operator.

In Example 56, the subject matter of any one of Examples 53-55 may optionally include that the logic is configured to update the database to indicate that the first frequency range is allocated to the second entity based on the allocation of the first frequency range.

In Example 57, the subject matter of any one of Examples 53-56 may optionally include that the logic is configured to: remove the allocation of the first frequency range from the second entity based on an occurrence of one or more conditions for deallocation of the first frequency range; and update the database to indicate that the first frequency range is available for allocation to an entity based on the removal.

In Example 58, the subject matter of Example 57 may optionally include that the one or more conditions relate to an expiration time associated with the allocation of the first frequency range, and that the removal is based on a determination that the expiration time has been reached.

In Example 59, the subject matter of Example 58 may optionally include that the logic is configured to notify the second entity regarding the expiration time within a predetermined time period before the expiration time.

In Example 60, the subject matter of any one of Examples 53-59 may optionally include that the logic is configured to: receive, from the first entity, a request for deallocation of the first frequency range; and remove the allocation of the first frequency range from the second entity based on the deallocation request.

In Example 61, the subject matter of Example 60 may optionally include that the removal is based on a determination that the first entity represents a spectrum owner that owns the first frequency range.

In Example 62, the subject matter of any one of Examples 60 and 61 may optionally include that the logic is configured to reallocate the first frequency range to the first entity based on the deallocation request.

In Example 63, the subject matter of any one of Examples 53-62 may optionally include that the logic is configured to: register the first entity and the second entity; store information relating to the registration of the first entity and the second entity in the database; and authenticate the allocation request based on the information relating to the registration of the second entity, wherein the allocation of the first frequency range is based on the authentication.

In Example 64, the subject matter of Example 63 may optionally include that the authentication is further based on the information relating to the registration of the first entity.

In Example 65, the subject matter of any one of Examples 63 and 64 may optionally include that the information relating to the registration of the first entity includes an indication of entities having permission to use the first frequency range.

Example 66 is a method comprising: receiving, from a first entity, spectrum information relating to a first frequency range available for allocation to an entity; storing the spectrum information in a database, wherein the database includes information relating to frequency ranges available for allocation to an entity and information relating to frequency ranges allocated to an entity; receiving a request for allocation of at least one frequency range to a second entity; querying the database for at least one frequency range available for allocation to the second entity based on the allocation request; determining that the first frequency range is available to satisfy the allocation request based on the query and the storage of the spectrum information; and allocating the first frequency range to the second entity based on the determination that the first frequency range is available to satisfy the request.

In Example 67, the subject matter of Example 66 may optionally include that the first entity represents a spectrum owner that owns the first frequency range.

In Example 68, the subject matter of any one of Examples 66 and 67 may optionally include that the second entity represents a network operator.

In Example 69, the subject matter of any one of Examples 66-68 may optionally include that the method includes updating the database to indicate that the first frequency range is allocated to the second entity based on the allocation of the first frequency range.

In Example 70, the subject matter of any one of Examples 66-69 may optionally include that the method includes: removing the allocation of the first frequency range from the second entity based on an occurrence of one or more conditions for deallocation of the first frequency range; and updating the database to indicate that the first frequency range is available for allocation to an entity based on the removal.

In Example 71, the subject matter of Example 70 may optionally include that the one or more conditions relate to an expiration time associated with the allocation of the first frequency range, and that the removal is based on a determination that the expiration time has been reached.

In Example 72, the subject matter of Example 71 may optionally include that the method includes notifying the second entity regarding the expiration time within a predetermined time period before the expiration time.

In Example 73, the subject matter of any one of Examples 66-72 may optionally include that the method includes: receiving, from the first entity, a request for deallocation of the first frequency range; and removing the allocation of the first frequency range from the second entity based on the deallocation request.

In Example 74, the subject matter of Example 73 may optionally include that the removal is based on a determination that the first entity represents a spectrum owner that owns the first frequency range.

In Example 75, the subject matter of any one of Examples 73 and 74 may optionally include that the method includes reallocating the first frequency range to the first entity based on the deallocation request.

In Example 76, the subject matter of any one of Examples 66-75 may optionally include that the method includes: registering the first entity and the second entity; storing information relating to the registration of the first entity and the second entity in the database; and authenticating the allocation request based on the information relating to the registration of the second entity, wherein the allocation of the first frequency range is based on the authentication.

In Example 77, the subject matter of Example 76 may optionally include that the authentication is further based on the information relating to the registration of the first entity.

In Example 78, the subject matter of any one of Examples 76 and 77 may optionally include that the information relating to the registration of the first entity includes an indication of entities having permission to use the first frequency range.

Example 79 is a system comprising the communication device of any one of Examples 53-65.

Example 80 is a computer-readable medium comprising computer-readable instructions physically embodied thereon which, when executed by a processor, causes the processor to perform the method of any one of Examples 66-78.

Example 81 is an apparatus comprising means for performing the method of any one of Examples 66-78.

Example 82 is a communication device comprising a memory unit, and logic configured to: receive, from a first entity, spectrum information relating to a first frequency range available for allocation to an entity; store the spectrum information in a database, wherein the database includes information relating to frequency ranges available for allocation to an entity and information relating to frequency ranges allocated to an entity; receive a request for allocation of at least one frequency range to a second entity; query the database for at least one frequency range available for allocation to the second entity based on the allocation request; determine that the first frequency range is available to satisfy the allocation request based on the query and the storage of the spectrum information; and allocate the first frequency range to the second entity based on the determination that the first frequency range is available to satisfy the request.

In Example 83, the subject matter of Example 82 may optionally include that the first entity represents a spectrum owner that owns the first frequency range.

In Example 84, the subject matter of any one of Examples 82 and 83 may optionally include that the second entity represents a network operator.

In Example 85, the subject matter of any one of Examples 82-84 may optionally include that the logic is configured to update the database to indicate that the first frequency range is allocated to the second entity based on the allocation of the first frequency range.

In Example 86, the subject matter of any one of Examples 82-85 may optionally include that the logic is configured to: remove the allocation of the first frequency range from the second entity based on an occurrence of one or more conditions for deallocation of the first frequency range; and update the database to indicate that the first frequency range is available for allocation to an entity based on the removal.

In Example 87, the subject matter of Example 86 may optionally include that the one or more conditions relate to an expiration time associated with the allocation of the first frequency range, and that the removal is based on a determination that the expiration time has been reached.

In Example 88, the subject matter of Example 87 may optionally include that the logic is configured to notify the second entity regarding the expiration time within a predetermined time period before the expiration time.

In Example 89, the subject matter of any one of Examples 82-88 may optionally include that the logic is configured to: receive, from the first entity, a request for deallocation of the first frequency range; and remove the allocation of the first frequency range from the second entity based on the deallocation request.

In Example 90, the subject matter of Example 89 may optionally include that the removal is based on a determination that the first entity represents a spectrum owner that owns the first frequency range.

In Example 91, the subject matter of any one of Examples 89 and 90 may optionally include that the logic is configured to reallocate the first frequency range to the first entity based on the deallocation request.

In Example 92, the subject matter of any one of Examples 82-91 may optionally include that the logic is configured to: register the first entity and the second entity; store information relating to the registration of the first entity and the second entity in the database; and authenticate the allocation request based on the information relating to the registration of the second entity, wherein the allocation of the first frequency range is based on the authentication.

In Example 93, the subject matter of Example 92 may optionally include that the authentication is further based on the information relating to the registration of the first entity.

In Example 94, the subject matter of any one of Examples 92 and 93 may optionally include that the information relating to the registration of the first entity includes an indication of entities having permission to use the first frequency range.

Example 95 is a method comprising: receiving, from a first entity, spectrum information relating to a first frequency range available for allocation to an entity; storing the spectrum information in a database, wherein the database includes information relating to frequency ranges available for allocation to an entity and information relating to frequency ranges allocated to an entity; receiving a request for allocation of at least one frequency range to a second entity; querying the database for at least one frequency range available for allocation to the second entity based on the allocation request; determining that the first frequency range is available to satisfy the allocation request based on the query and the storage of the spectrum information; and allocating the first frequency range to the second entity based on the determination that the first frequency range is available to satisfy the request.

In Example 96, the subject matter of Example 95 may optionally include that the first entity represents a spectrum owner that owns the first frequency range.

In Example 97, the subject matter of any one of Examples 95 and 96 may optionally include that the second entity represents a network operator.

In Example 98, the subject matter of any one of Examples 95-97 may optionally include that the method includes updating the database to indicate that the first frequency range is allocated to the second entity based on the allocation of the first frequency range.

In Example 99, the subject matter of any one of Examples 95-98 may optionally include that the method includes: removing the allocation of the first frequency range from the second entity based on an occurrence of one or more conditions for deallocation of the first frequency range; and updating the database to indicate that the first frequency range is available for allocation to an entity based on the removal.

In Example 100, the subject matter of Example 99 may optionally include that the one or more conditions relate to an expiration time associated with the allocation of the first frequency range, and that the removal is based on a determination that the expiration time has been reached.

In Example 101, the subject matter of Example 100 may optionally include that the method includes notifying the second entity regarding the expiration time within a predetermined time period before the expiration time.

In Example 102, the subject matter of any one of Examples 95-101 may optionally include that the method includes: receiving, from the first entity, a request for deallocation of the first frequency range; and removing the allocation of the first frequency range from the second entity based on the deallocation request.

In Example 103, the subject matter of Example 102 may optionally include that the removal is based on a determination that the first entity represents a spectrum owner that owns the first frequency range.

In Example 104, the subject matter of any one of Examples 102 and 103 may optionally include that the method includes reallocating the first frequency range to the first entity based on the deallocation request.

In Example 105, the subject matter of any one of Examples 95-104 may optionally include that the method includes: registering the first entity and the second entity; storing information relating to the registration of the first entity and the second entity in the database; and authenticating the allocation request based on the information relating to the registration of the second entity, wherein the allocation of the first frequency range is based on the authentication.

In Example 106, the subject matter of Example 105 may optionally include that the authentication is further based on the information relating to the registration of the first entity.

In Example 107, the subject matter of any one of Examples 105 and 106 may optionally include that the information relating to the registration of the first entity includes an indication of entities having permission to use the first frequency range.

Example 108 is a system comprising the communication device of any one of Examples 82-94.

Example 109 is an apparatus comprising means for performing the method of any one of Examples 95-107.

Example 110 is a communication device comprising a memory unit, and logic configured to: receive, from a first entity, spectrum information relating to a first frequency range available for allocation to an entity; store the spectrum information in a database, wherein the database includes information relating to frequency ranges available for allocation to an entity and information relating to frequency ranges allocated to an entity; receive a request for allocation of at least one frequency range to a second entity; query the database for at least one frequency range available for allocation to the second entity based on the allocation request; determine that the first frequency range is available to satisfy the allocation request based on the query and the storage of the spectrum information; and allocate the first frequency range to the second entity based on the determination that the first frequency range is available to satisfy the request.

In Example 111, the subject matter of Example 110 may optionally include that the first entity represents a spectrum owner that owns the first frequency range.

In Example 112, the subject matter of any one of Examples 110 and 111 may optionally include that the second entity represents a network operator.

In Example 113, the subject matter of any one of Examples 110-112 may optionally include that the logic is configured to update the database to indicate that the first frequency range is allocated to the second entity based on the allocation of the first frequency range.

In Example 114, the subject matter of any one of Examples 110-113 may optionally include that the logic is configured to: remove the allocation of the first frequency range from the second entity based on an occurrence of one or more conditions for deallocation of the first frequency range; and update the database to indicate that the first frequency range is available for allocation to an entity based on the removal.

In Example 115, the subject matter of Example 114 may optionally include that the one or more conditions relate to an expiration time associated with the allocation of the first frequency range, and that the removal is based on a determination that the expiration time has been reached.

In Example 116, the subject matter of Example 115 may optionally include that the logic is configured to notify the second entity regarding the expiration time within a predetermined time period before the expiration time.

In Example 117, the subject matter of any one of Examples 110-116 may optionally include that the logic is configured to: receive, from the first entity, a request for deallocation of the first frequency range; and remove the allocation of the first frequency range from the second entity based on the deallocation request.

In Example 118, the subject matter of Example 117 may optionally include that the removal is based on a determination that the first entity represents a spectrum owner that owns the first frequency range.

In Example 119, the subject matter of any one of Examples 117 and 118 may optionally include that the logic is configured to reallocate the first frequency range to the first entity based on the deallocation request.

In Example 120, the subject matter of any one of Examples 110-119 may optionally include that the logic is configured to: register the first entity and the second entity; store information relating to the registration of the first entity and the second entity in the database; and authenticate the allocation request based on the information relating to the registration of the second entity, wherein the allocation of the first frequency range is based on the authentication.

In Example 121, the subject matter of Example 120 may optionally include that the authentication is further based on the information relating to the registration of the first entity.

In Example 122, the subject matter of any one of Examples 120 and 121 may optionally include that the information relating to the registration of the first entity includes an indication of entities having permission to use the first frequency range.

Example 123 is a method comprising: receiving, from a first entity, spectrum information relating to a first frequency range available for allocation to an entity; storing the spectrum information in a database, wherein the database includes information relating to frequency ranges available for allocation to an entity and information relating to frequency ranges allocated to an entity; receiving a request for allocation of at least one frequency range to a second entity; querying the database for at least one frequency range available for allocation to the second entity based on the allocation request; determining that the first frequency range is available to satisfy the allocation request based on the query and the storage of the spectrum information; and allocating the first frequency range to the second entity based on the determination that the first frequency range is available to satisfy the request.

In Example 124, the subject matter of Example 123 may optionally include that the first entity represents a spectrum owner that owns the first frequency range.

In Example 125, the subject matter of any one of Examples 123 and 124 may optionally include that the second entity represents a network operator.

In Example 126, the subject matter of any one of Examples 123-125 may optionally include that the method includes updating the database to indicate that the first frequency range is allocated to the second entity based on the allocation of the first frequency range.

In Example 127, the subject matter of any one of Examples 123-124 may optionally include that the method includes: removing the allocation of the first frequency range from the second entity based on an occurrence of one or more conditions for deallocation of the first frequency range; and updating the database to indicate that the first frequency range is available for allocation to an entity based on the removal.

In Example 128, the subject matter of Example 127 may optionally include that the one or more conditions relate to an expiration time associated with the allocation of the first frequency range, and that the removal is based on a determination that the expiration time has been reached.

In Example 129, the subject matter of Example 128 may optionally include that the method includes notifying the second entity regarding the expiration time within a predetermined time period before the expiration time.

In Example 130, the subject matter of any one of Examples 123-129 may optionally include that the method includes: receiving, from the first entity, a request for deallocation of the first frequency range; and removing the allocation of the first frequency range from the second entity based on the deallocation request.

In Example 131, the subject matter of Example 130 may optionally include that the removal is based on a determination that the first entity represents a spectrum owner that owns the first frequency range.

In Example 132, the subject matter of any one of Examples 130 and 131 may optionally include that the method includes reallocating the first frequency range to the first entity based on the deallocation request.

In Example 133, the subject matter of any one of Examples 123-132 may optionally include that the method includes: registering the first entity and the second entity; storing information relating to the registration of the first entity and the second entity in the database; and authenticating the allocation request based on the information relating to the registration of the second entity, wherein the allocation of the first frequency range is based on the authentication.

In Example 134, the subject matter of Example 133 may optionally include that the authentication is further based on the information relating to the registration of the first entity.

In Example 135, the subject matter of any one of Examples 133 and 134 may optionally include that the information relating to the registration of the first entity includes an indication of entities having permission to use the first frequency range.

Example 136 is a computer-readable medium comprising computer-readable instructions physically embodied thereon to implement, when executed, the communication device of any one of Examples 110-122 or the method of any one of Examples 123-135.

Example 137 is an apparatus comprising means for performing the method of any one of Examples 123-135.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary aspects of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of method, processing elements, or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A communication device, comprising:
a memory unit; and
logic configured to:
  receive a request for allocation of at least one frequency range to a second entity;
  query a database for at least one frequency range available for allocation to the second entity based on the allocation request, wherein the database includes information related to frequency ranges available for allocation to an entity;
  allocate a first frequency range related to a first entity to the second entity based on a determination that, responsive to the query and the information stored in the database, the first frequency range of the frequency ranges is available to satisfy the allocation request; and
  remove the allocation of the first frequency range from the second entity based on a deallocation event.

2. The communication device of claim 1, wherein the first entity represents a spectrum owner that owns the first frequency range, and wherein the second entity represents a network operator.

3. The communication device of claim 1, wherein the logic is configured to update the database to indicate that the first frequency range is allocated to the second entity based on the allocation of the first frequency range.

4. The communication device of claim 1, wherein the logic is configured to:
  remove the allocation of the first frequency range from the second entity based on an occurrence of one or more conditions for deallocation of the first frequency range; and update the database to indicate that the first frequency range is available for allocation to an entity based on the removal.

5. The communication device of claim 4, wherein the one or more conditions relate to an expiration time associated with the allocation of the first frequency range, wherein the removal is based on a determination that the expiration time has been reached, and wherein the logic is configured to notify the second entity regarding the expiration time within a predetermined time period before the expiration time.

6. The communication device of claim 1, wherein the logic is configured to:
 receive, from the first entity, a request for deallocation of the first frequency range; and
 remove the allocation of the first frequency range from the second entity based on the deallocation request.

7. The communication device of claim 6, wherein the removal is based on a determination that the first entity represents a spectrum owner that owns the first frequency range.

8. The communication device of claim 6, wherein the logic is configured to reallocate the first frequency range to the first entity based on the deallocation request.

9. The communication device of claim 1, wherein the logic is configured to:
 register the first entity and the second entity;
 store information relating to the registration of the first entity and the second entity in the database;
 receive, from the first entity, spectrum information related to the first frequency range available for allocation to an entity; and
 store the spectrum information in the database; and
 authenticate the allocation request based on the information relating to the registration of the second entity,
 wherein the determination that the first frequency range is available to satisfy the allocation request is further based on the spectrum information related to the first frequency range, and the allocation of the first frequency range is based on the authentication.

10. The communication device of claim 9, wherein the authentication is further based on the information relating to the registration of the first entity, and wherein the information relating to the registration of the first entity includes an indication of entities having permission to use the first frequency range.

11. A method comprising:
 receiving, by one or more processors,. a request for allocation of at least one frequency range to a second entity;
 querying, by the one or more processors, a database for at least one frequency range available for allocation to the second entity based on the allocation request, wherein the database includes information related to frequency ranges available for allocation to an entity;
 allocating, by the one or more processors, a first frequency range related to a first entity to the second entity based on a determination that, responsive to the querying and the information stored in the database, the first frequency range of the frequency ranges is available to satisfy the allocation request; and
 removing, by the one or more processors, the allocation of the first frequency range from the second entity based on a deallocation event.

12. The method of claim 11, wherein the first entity represents a spectrum owner that owns the first frequency range, and wherein the second entity represents a network operator.

13. The method of claim 11, further comprising:
 updating, by the one or more processors, the database to indicate that the first frequency range is allocated to the second entity based on the allocation of the first frequency range.

14. The method of claim 11, further comprising:
 removing, by the one or more processors, the allocation of the first frequency range from the second entity based on an occurrence of one or more conditions for deallocation of the first frequency range; and
 updating, by the one or more processors, the database to indicate that the first frequency range is available for allocation to an entity based on the removal.

15. The method of claim 14, wherein the one or more conditions relate to an expiration time associated with the allocation of the first frequency range, wherein the removal is based on a determination that the expiration time has been reached, the method further comprising:
 notifying, by the one or more processors, the second entity regarding the expiration time within a predetermined time period before the expiration time.

16. The method of claim 11, further comprising:
 receiving, by the one or more processors, from the first entity, a request for deallocation of the first frequency range; and
 removing, by the one or more processors, the allocation of the first frequency range from the second entity based on the deallocation request.

17. The method of claim 16, wherein the removal is based on a determination that the first entity represents a spectrum owner that owns the first frequency range.

18. The method of claim 16, further comprising:
 reallocating, by the one or more processors, the first frequency range to the first entity based on the deallocation request.

19. The method of claim 11, further comprising:
 registering, by the one or more processors, the first entity and the second entity;
 storing, by the one or more processors, information relating to the registration of the first entity and the second entity in the database;
 receiving, by the one or more processors, from the first entity, spectrum information related to the first frequency range available for allocation to an entity; and
 storing, by the one or more processors, the spectrum information in the database; and
 authenticating, by the one or more processors, the allocation request based on the information relating to the registration of the second entity,
 wherein the determination that the first frequency range is available to satisfy the allocation request is further based on the spectrum information related to the first frequency range, and the allocation of the first frequency range is based on the authentication.

20. The method of claim 19, wherein the authentication is further based on the information relating to the registration of the first entity, and wherein the information relating to the registration of the first entity includes an indication of entities having permission to use the first frequency range.

* * * * *